Jan. 17, 1933.   W. J. GABEL ET AL   1,894,859

VALVE

Filed Oct. 8, 1931

W. J. Gabel and
J. S. Bretz  Inventors

By   Attorney

Patented Jan. 17, 1933

1,894,859

UNITED STATES PATENT OFFICE

WILLIAM J. GABEL AND JOHN S. BRETZ, OF GREAT FALLS, MONTANA; SAID GABEL ASSIGNOR OF FIVE PER CENT TO SAID BRETZ

VALVE

Application filed October 8, 1931. Serial No. 567,738.

This invention relates to new and useful improvements in internal combustion engines, and particularly to the inlet valves thereof.

The principal object of the invention is to provide a valve construction, of this character, wherein air is effectively prevented from passing into the engine cylinders around the valve stems.

Other objects and advantages will be apparent from the following description when taken in connection with the accompanying drawing.

Figures 1, 2, 3:
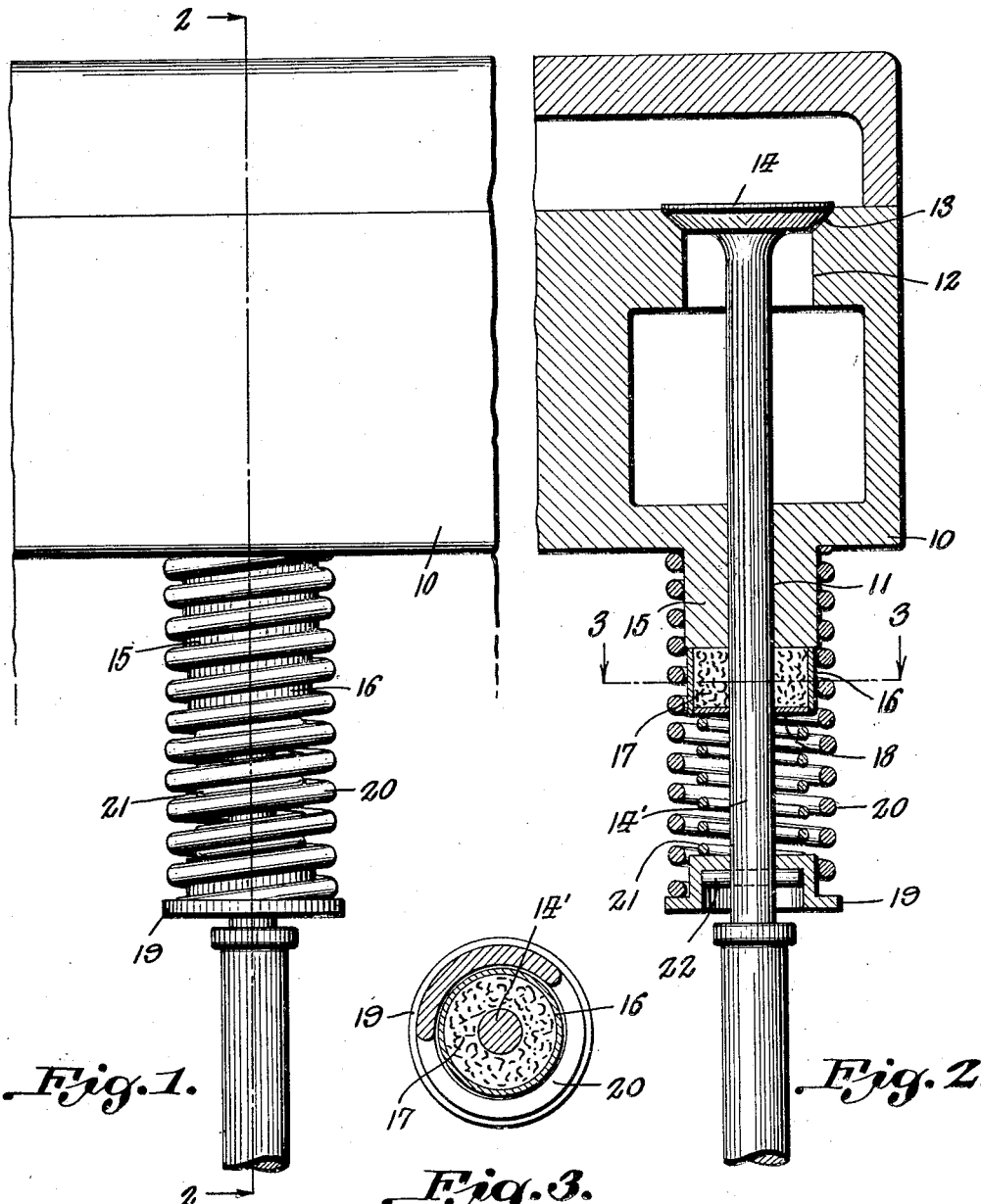
Figure 1 is an elevation showing a portion of an engine block, with a valve associated therewith, said valve being equipped with the air excluding means of the present invention.
Figure 2 is a vertical sectional view on the line 2—2 of Figure 1.

Figure 3 a horizontal sectional view on the line 3—3 of Figure 2.

Referring particularly to the accompanying drawing, 10 represents a portion of an engine block, having the valve stem opening 11, with the valve seat in one end of said opening 12, shown at 13, on which is seated the valve 14, said valve having a rod 14' slidably engaged in said opening 11, and passing through the boss, or valve stem guide, 15, surrounding the outer end of said opening 11. Disposed against the outer end face of said valve stem guide 15 is one end of an open-ended cylindrical casing 16, within which is disposed a mass of loose fabric packing, such as felt, or the like, as at 17. A centrally apertured disk 18 is disposed within the other end of said cylindrical casing, and engaging with said packing. The stem or rod 14' is slidable through the center of said disk 18, and receives on its outer end the disk or plate 19. Disposed with its inner end properly encircling the guide 15, is the usual valve closing spring 20, the outer end of which receives the central portion of the disk 19, as is clearly seen in the sectional view, Figure 2. Within the spring 20 is a coil spring of slightly smaller diameter, and length, as shown at 21, the inner end of which bears against the said disk 18, while the outer end bears against the disk or plate 19, such spring serving to maintain the packing in such compressed condition, against the rod or stem 14', of the valve, that passage of any air, through the opening 11, around the rod 14', will be impossible, thereby effectively excluding such air from the cylinders. The springs 20 and 21 are held in proper compressed condition, so that the valve 14 may be held to its seat, by means of the usual pin 22 disposed transversely through the outer end of the valve stem or rod, outwardly of the plate 19, as shown.

It will be particularly noted that the casing 16 rests on the outer end of the guide 15, and is held from any tendency to expand, due to the fact that said casing 16 is confined, and engaged by the coils of the larger spring 20. The packing 17 is compressed from its outer end by the disk 18, which is urged thereagainst by the coil spring 21, so that such packing will tightly embrace the rod or stem 14', and cover the opening 11, surrounding said rod or stem, whereby to render the joint air tight.

It will be understood that, when the springs 20 and 21 have been compressed, by the usual method used in compressing the valve spring 20, to properly seat the valve 14, the spring 21 will press the disk 18 against the packing 17, whereby to cause the proper compression of the packing, because of the compression of said spring by the disk or plate 19. The packing is, of course, previously soaked in oil, so that the same may be fed to the valve rod, as the latter reciprocates therethrough, and through the opening in the guide 15.

What is claimed is:

The combination with the valve stem guide of an engine block, the valve stem in said guide, and the spring of said valve stem, of a packing therefor comprising an open-ended casing having an end bearing against said guide in surrounding relation to said stem and confined within and engaged by the coils of said spring, a compressible packing within said casing embracing said valve stem and having an end bearing against said guide, a disk in the other end of said casing, and a spring within the first spring bearing against said disk whereby to compress said packing against said valve stem and into the valve stem opening of said guide.

In testimony whereof, we affix our signatures.

WILLIAM J. GABEL.
JOHN S. BRETZ.